US008818437B2

(12) United States Patent
Chan et al.

(10) Patent No.: US 8,818,437 B2
(45) Date of Patent: Aug. 26, 2014

(54) NARROWBAND INTERFERENCE AVOIDANCE FOR DYNAMIC CHANNEL ASSIGNMENT

(75) Inventors: Douglas Chan, San Jose, CA (US); Suyog Deshpande, Santa Clara, CA (US); Sandeep Jay Shetty, San Jose, CA (US); David Kloper, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 384 days.

(21) Appl. No.: 13/195,924

(22) Filed: Aug. 2, 2011

(65) Prior Publication Data

US 2013/0035128 A1 Feb. 7, 2013

(51) Int. Cl.
*H04B 7/00* (2006.01)
*H04B 17/00* (2006.01)
*H04B 15/00* (2006.01)

(52) U.S. Cl.
USPC .................. 455/513; 455/67.13; 455/63.1

(58) Field of Classification Search
USPC ............ 455/41.2, 513, 67.13, 63.1, 450, 509, 455/452.1, 452.2
See application file for complete search history.

(56) References Cited

U.S. PATENT DOCUMENTS

| | | | |
|---|---|---|---|
| 6,714,605 B2 | 3/2004 | Sugar et al. | |
| 6,850,735 B2 | 2/2005 | Sugar et al. | |
| 6,941,110 B2 | 9/2005 | Kloper et al. | |
| 7,035,593 B2 | 4/2006 | Miller et al. | |
| 7,079,812 B2 | 7/2006 | Miller et al. | |
| 7,116,943 B2 | 10/2006 | Sugar et al. | |
| 7,171,161 B2 | 1/2007 | Miller | |
| 7,184,777 B2 | 2/2007 | Diener et al. | |
| 7,224,752 B2 | 5/2007 | Sugar et al. | |
| 7,254,191 B2 | 8/2007 | Sugar et al. | |
| 7,269,151 B2 | 9/2007 | Diener et al. | |
| 7,292,656 B2 | 11/2007 | Kloper et al. | |
| 7,408,907 B2 | 8/2008 | Diener | |
| 7,424,268 B2 | 9/2008 | Diener et al. | |
| 7,450,673 B2 | 11/2008 | Jin et al. | |
| 7,596,461 B2 | 9/2009 | Hart et al. | |
| 7,606,335 B2 | 10/2009 | Kloper et al. | |
| 7,801,239 B2 | 9/2010 | Jin et al. | |
| 7,924,957 B2 | 4/2011 | Jin | |
| 2007/0298810 A1* | 12/2007 | Kasher et al. | 455/452.1 |
| 2008/0019324 A1* | 1/2008 | Matsumoto et al. | 370/335 |
| 2008/0039146 A1 | 2/2008 | Jin | |
| 2010/0177857 A1* | 7/2010 | Huttunen et al. | 375/350 |
| 2011/0217985 A1* | 9/2011 | Gorokhov | 455/452.2 |

* cited by examiner

*Primary Examiner* — Zhiyu Lu
*Assistant Examiner* — Xin Jia
(74) *Attorney, Agent, or Firm* — Edell, Shapiro & Finnan, LLC (57) ABSTRACT

Techniques are provided to improve the performance of wireless devices that serve wireless client devices in a wireless network in the presence of narrowband interference. The wireless device that serves wireless client devices in the wireless network receives energy in a plurality of channels of a frequency band. The received energy is analyzed for occurrence and type of interference in each channel. A quality metric is generated for each channel incorporating the occurrence and type of interference detected in the channel. For each channel, a bias value against selection of the channel is assigned based on whether narrowband interference is present in the channel. The bias value for each channel is applied to the quality metric for the channel to produce an adjusted quality metric for each channel. A channel is selected based on the adjusted quality metric for each of the plurality of channels.

20 Claims, 8 Drawing Sheets

FIG. 8

NARROWBAND INTERFERENCE AVOIDANCE FOR DYNAMIC CHANNEL ASSIGNMENT

TECHNICAL FIELD

The present disclosure relates to wireless communication networks and systems.

BACKGROUND

In wireless communication environments, such as WiFi™ wireless local area networks, there are a plurality of frequency channels that may be used by wireless access point devices to serve wireless client devices. In the 2.4 GHz frequency band, the WiFi frequency channels are overlapping. For example, channel 1 overlaps substantially with channel 2, channel 2 overlaps substantially with channel 3 and so on. However, channel 1 does not overlap with channels 5 and higher. As a result, it is common to allocate a channel set consisting of non-overlapping channels for use by access points in a given network deployment so that the signals for the different basic service sets served by the access point devices do not interfere with each other.

Interference in the frequency band can also affect performance in the wireless network. Knowledge about the presence and frequency location of interference is also useful for determining which channels to assign to access point devices in a given wireless network deployment.

DESCRIPTION OF EXAMPLE EMBODIMENTS

Overview

Techniques are provided to improve the performance of wireless devices that serve wireless client devices in a wireless network in the presence of narrowband interference. A wireless device that serves wireless client devices in the wireless network receives energy in a plurality of channels of a frequency band. The received energy is analyzed for occurrence and type of interference in each channel. A quality metric is generated for each channel incorporating the occurrence and type of interference detected in the channel. For each channel, a bias value against selection of the channel is assigned based on whether narrowband interference is present in the channel. The bias value for each channel is applied to the quality metric for the channel to produce an adjusted quality metric for each channel. A channel is selected for use in the frequency band based on the adjusted quality metric for each of the plurality of channels.

Example Embodiments

There is an advantage in distinguishing narrowband interference from interference that is relatively more spread out across a channel. Most conventional wireless local area network (WLAN) devices only report the aggregate total radio frequency (RF) energy present on a channel and do not distinguish the nature of the interference. Specifically, these devices would indicate the same level of RF interference energy for a channel, whether it is ambient energy or narrowband energy. For example, for these devices, there is no difference in (i) having rogue overlapping Basic Service Sets (BSSs) nearby emitting at a total of −60 dBm on the same channel or (ii) one narrowband interference of 500 kHz emitting at −60 dBm. The WLAN access point (AP) would report −60 dBm of interference for both cases. However, it is more detrimental for an 802.11 WLAN transmission that employs orthogonal frequency division (OFDM) if the interference is narrowband interference because the narrowband interference can entirely overwhelm those subcarriers of OFDM transmission that overlap with it, making recovery of the transmitted data symbols impossible. In the case of ambient noise, the errors may not be concentrated in the same area of a packet frame and therefore the data may still be recoverable using forward error correction coding.

There has been a proliferation of narrowband interferers, particularly in the 2.4 GHz frequency band. For example, wireless video cameras may operate with a 6 MHz channel width and employ National Television System Committee (NTSC) or Phase Alternating Line (PAL) transmission protocols that can easily render entire BSSs in the vicinity unusable. Similar effects can occur from Time Division Duplex (TDD) cordless phones, non-Bluetooth headsets and audio and video devices. Spectrum intelligence capabilities (as embodied in a spectrum analysis unit of an AP described below in connection with FIG. 4) can accurately report interference as low as −105 dBm and at resolution up to 156 kHz.

Figure 1:
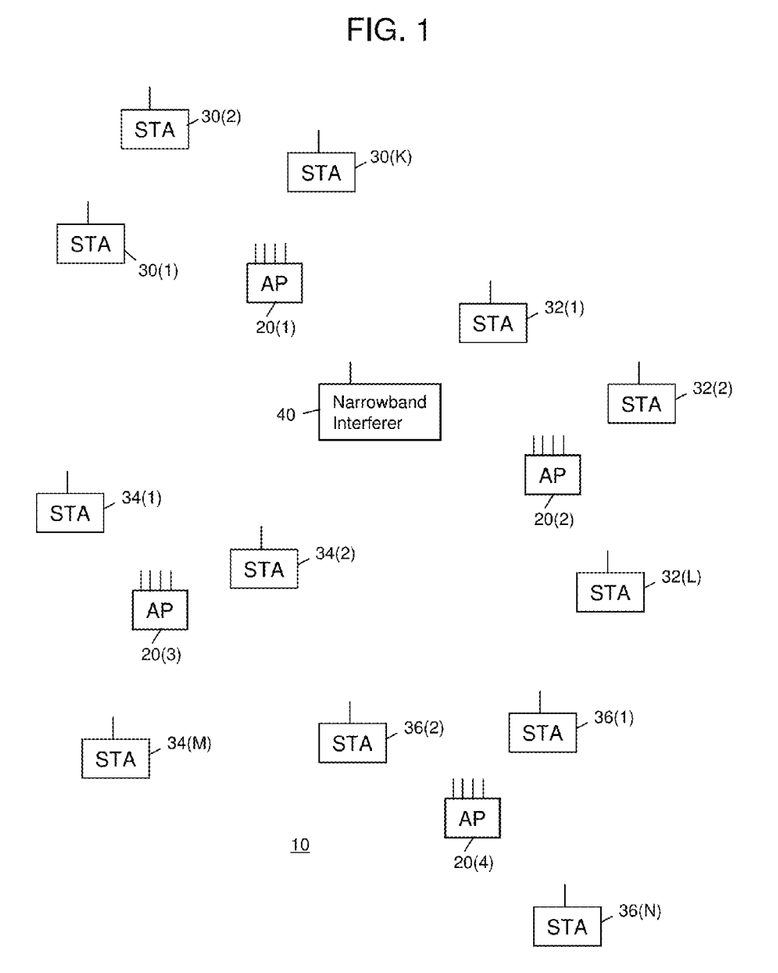
FIG. 1 is a block diagram showing an example of a wireless local area network deployment comprising a plurality of wireless access point devices configured to serve wireless client devices in the presence of narrowband interference.

Referring first to FIG. 1, a wireless network deployment is shown generally at reference numeral 10 comprising a plurality of wireless AP devices 20(1), 20(2), 20(3) and 20(4) each configured to serve wireless client devices, also called stations (STAs). For example, AP 20(1) serves STAs 30(1)-30(K), AP 20(2) serves STAs 32(1)-32(L), AP 20(3) serves STAs 34(1)-34(M) and AP 20(4) serves STAs 36(1)-36(N). There is a narrowband interferer 40 that, as described further hereinafter, emits a relatively narrowband of interference in one of the channels used by the devices shown in FIG. 1.

One or more of the APs 20(1)-20(4) shown in FIG. 1 is configured with spectrum analysis and intelligence capabilities to detect and classify the type of interference occurring in a frequency band. In one example, the APs 20(1)-20(4) are configured to operate in accordance with the IEEE 802.11

WLAN communication protocols in the 2.4 GHz frequency band. The 2.4 GHz frequency band comprises a plurality of overlapping channels that are increments of frequencies apart from each other. Techniques are provided herein to use the spectrum intelligence information gathered by one or more APs to assign channels to one or more APs so as to avoid interferences that are of narrowband nature, e.g., narrowband interferer 40.

Figure 2:
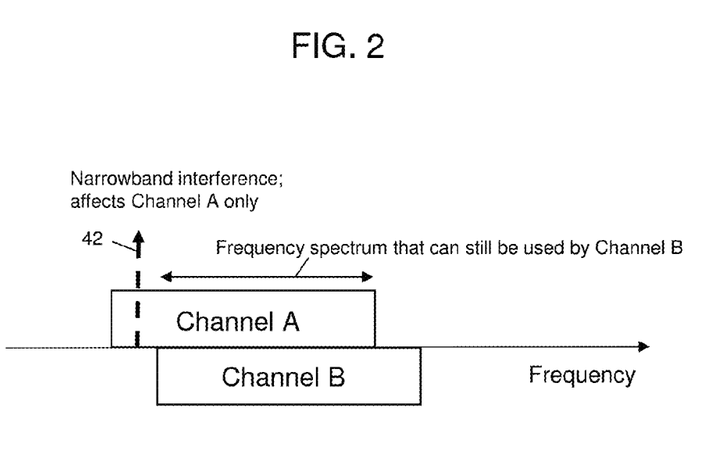
FIG. 2 is a diagram illustrating first and second overlapping channels and narrowband interference in a portion of a first channel that leaves the second channel available for use.

Reference is now made to FIG. 2. FIG. 2 shows two adjacent overlapping channels, identified as Channel A and Channel B, in a frequency band. Each channel covers a part of the frequency band that is 5 MHz away from its adjacent channel. Thus, Channels A and B overlap significantly, but Channel A still covers some frequency bandwidth, e.g., 5 MHz of frequency, that Channel B does not, and vice versa. It is precisely this property, together with knowledge of the frequency location of narrowband interference, that is exploited according to the techniques described herein to assign frequency channels for a WLAN deployment that avoids the effects of narrowband interference.

Continuing with the example shown in FIG. 2, a spectrum of a relatively narrowband interference is shown at reference numeral 42. For example, the narrowband interference is a few MHz wide and is confined to one portion of Channel A. The Basic Service Sets of APs in the vicinity of this interference do not need to completely avoid the entire frequency range covered by Channel A. That is, since the narrowband interference 42 is confined to the lower end of Channel A, Channel B is entirely unaffected by the interference and is therefore available for use. Consequently, by using Channel B (instead of avoiding it due to the interference in adjacent Channel A) a significant portion of the frequency spectrum not affected by the narrowband interference can still being utilized.

There are APs currently available from Cisco Systems, Inc., that have a spectrum intelligence capability by which narrowband interference can be distinguished from other types of interference, and more generally, an RF quality metric can be determined for a channel based on the types of interference detected by the AP on channels that the AP is operating or is configured to analyze. The capabilities of such APs are leveraged according to the techniques presented herein to more precisely assign frequency channels to APs so as to more efficiently use the spectrum of overlapping channels in the presence of narrowband interferences.

Figure 3:
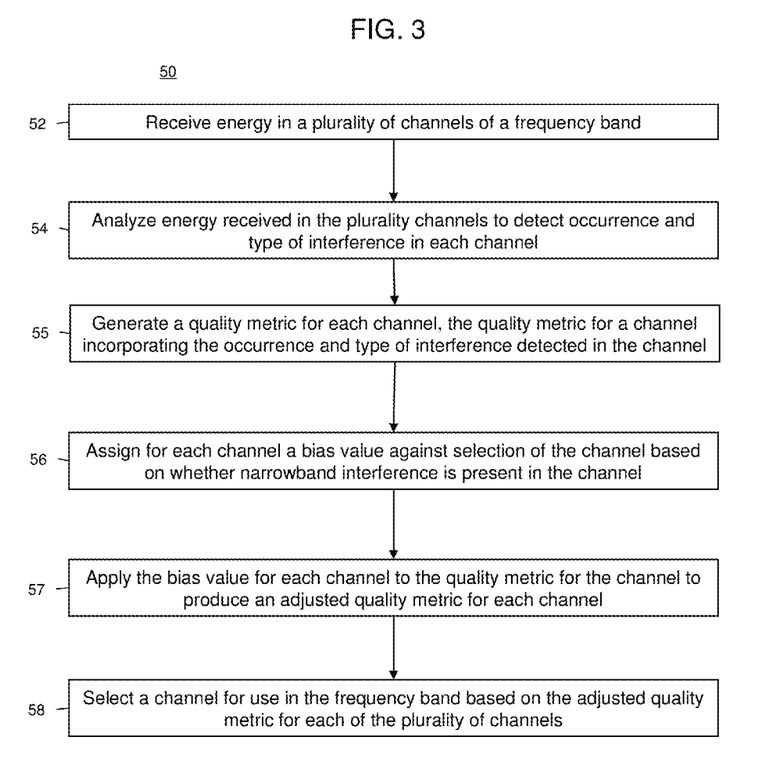
FIG. 3 is a flow chart generally depicting a process for avoiding narrowband interference when assigning use of an overlapping channel by a wireless access point device.

FIG. 3 illustrates a flow chart generally depicting a process 50 by which overlapping channels are assigned to an AP in the presence of narrowband interference according to the techniques described herein. At 52, one or more APs receive energy in a plurality of channels of a frequency band. At 54, the received energy is analyzed for occurrence and type of interference in each channel. At 55, based on the analysis made at 54, a quality metric is generated for each channel, the quality metric for a channel incorporating the occurrence and type of interference detected in the channel. At 56, a bias value against selection of the channel is assigned for each channel based on whether narrowband interference is present in the channel. At 57, the bias value for each channel is applied to the quality metric for the channel to produce an adjusted quality metric for each channel. As explained further herein, the bias value may be assigned to a channel so as to minimize impact of narrowband interference or to avoid the narrowband interference. Moreover, the bias value assigned to a channel may be based on the bandwidth of the interference in the channel relative to the bandwidth of the channel. At 58, a channel for use in the frequency band is selected based on the adjusted quality metric for each of the plurality of channels. As described herein, channel selection may involve selecting between channels that overlap such that detected narrowband interference may impact several channels. Also as described further hereinafter, the receiving, analyzing, generating, assigning and applying operations are performed with respect to a plurality of wireless devices operating in the frequency band, and the selecting operation may involve selecting channels for use by each of the plurality of wireless devices for the plurality of channels. The selecting operation may involve selecting among a plurality of sets of non-overlapping channels. Further still, as described hereinafter, the receiving, analyzing, generating, assigning, applying and selecting operations may be performed for two or more channels of different bandwidths.

Figure 4:
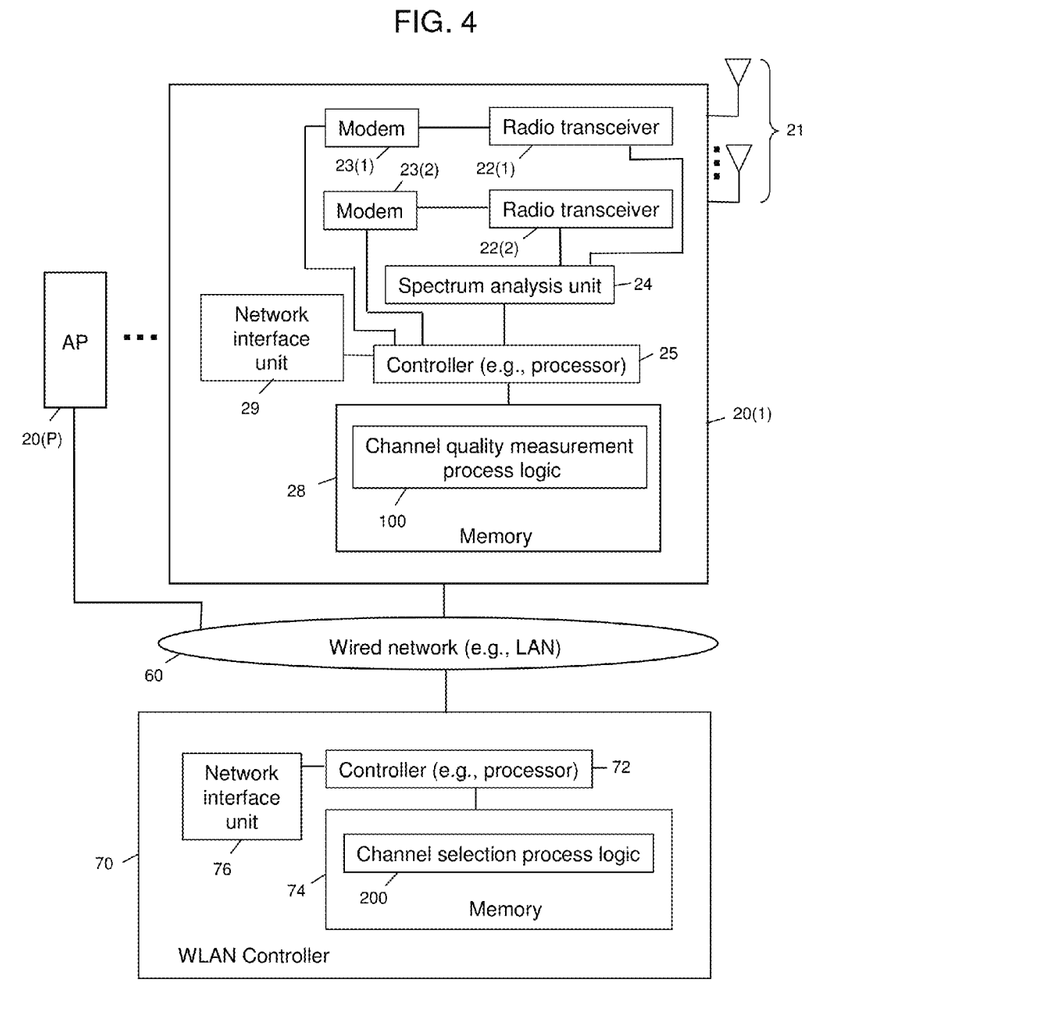
FIG. 4 illustrates a block diagram of an example wireless access point device configured to determine quality of channels in a frequency band for purposes of channel assignment and of an example wireless local area network controller apparatus configured to make channel assignments using channel quality information from wireless access point devices.

Reference is now made to FIG. 4 for a description of an AP and related controller equipment configured to perform various techniques described herein. The AP, identified arbitrarily by reference numeral 20(1), comprises components that enable it to wirelessly serve STAs in a WLAN. In the example shown in FIG. 4, the AP is capable of simultaneously communicating on multiple channels, and to this end comprises first and second radio transceivers 22(1) and 22(2) and associated modems 23(1) and 23(2). However, in other forms, the AP may comprise a single radio transceiver and a single modem. The radio transceivers 22(1) and 22(2) are coupled to one or more antennas shown collectively at 21.

There is a spectrum analysis unit 24 that is coupled to the radio transceivers 22(1) and 22(1). The spectrum analysis unit 24 comprises hardware (e.g., digital logic gates) configured to perform real-time analysis of individual segments (subdivisions) of spectrum to generate reports about the types of energy detected in those segments. The spectrum analysis unit 24 may, in some forms, be integrated in the modems 23(1) and 23(2). The spectrum analysis unit 24 may comprise a hardware accelerator unit configured to generate statistics data related to energy detected in the frequency band, and the statistics data is then analyzed (either in hardware or software) to determine a type of interference (signals other than WLAN signals), signals from other APs, etc., in various channels of the frequency band, and more specifically, within subdivisions of channels in the frequency band, as described further hereinafter. The spectrum analysis unit 25 also outputs statistics about the detected energy, such as strength (dBm), bandwidth, duty cycle, center frequency, etc.

A controller 25 is coupled to the spectrum analysis unit 24 and to the modems 23(1) and 23(2). The controller 25 is a microprocessor or microcontroller, for example, that is configured to perform control operations for the AP 20(1). The controller 25 may also be configured or programmed to carry out operations related to the channel quality measurement and assignment techniques described herein.

A memory device 28 is provided that is coupled to the controller 25. The memory device 28 may comprise read only memory (ROM), random access memory (RAM), magnetic disk storage media devices, optical storage media devices, flash memory devices, electrical, optical, or other physical/tangible memory storage devices. The controller 25 executes instructions for channel quality process logic 100 stored in memory 28. Thus, in general, the memory 28 may comprise one or more computer readable storage media (e.g., a memory device) encoded with software comprising computer executable instructions and when the software is executed (by the controller 25) it is operable to perform the operations described herein in connection with process logic 100. The memory 28 may also store instructions for interference classification/identification process logic (not shown) that the controller 25 executes in order to classify interference detected by the AP.

The AP 20(1) also comprises a network interface unit 29, e.g., an Ethernet card, that enables wired network communications over a wired network 60, e.g., a local area network (LAN).

In a given WLAN deployment comprising multiple APs, e.g., APs 20(1)-20(P) in FIG. 4, each AP is connected to the wired network 60. A WLAN controller device 70 is also coupled to the network 60 and controls the APs 20(1)-20(P), e.g., makes channel assignments for the APs 20(1)-20(P) and sends controls or commands to the APs 20(1)-20(P) to notify them of the channels that they are to use. The WLAN controller 70 comprises, among other components, a controller 72, e.g., a microprocessor or microcontroller, memory 74 and a network interface unit 76. The memory stores instructions for channel quality process logic 200 executed by the controller 72.

Thus, as depicted in FIG. 4, each AP 20(1)-20(P) is configured to execute a channel quality process to gather information about the quality (and thus occurrence and type of interference) of channels in the spectrum. The APs 20(1)-20(P) send this information to the WLAN controller 70 which then assigns channels to the APs according to the techniques described herein. This is only one example configuration. Another configuration may involve one of the APs serving as a control point for all of the APs in a WLAN deployment in which case that AP is also configured with the channel selection process logic 200. In still another configuration, each AP may send its "raw" spectrum analysis data (generated by the spectrum analysis unit 25 in the AP) to the WLAN controller 70 or to another AP, and the WLAN controller 70 or the other AP analyzes the data to characterize/classify the interference, and performs the channel selection/assignment for all of the APs.

Figure 5:
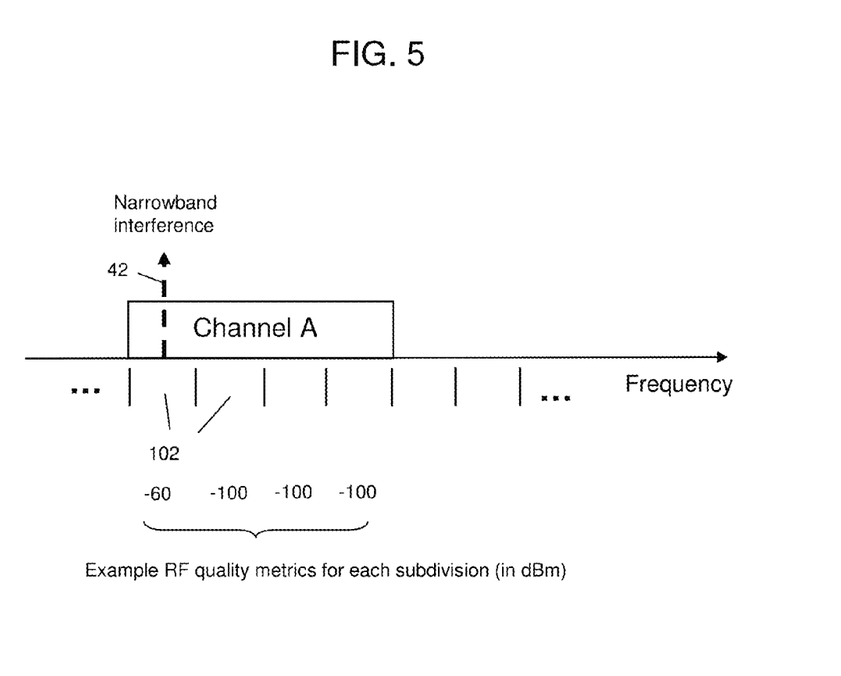
FIG. 5 is a diagram illustrating an example of a channel quality determination technique based on energy in subdivisions of a channel.
Figure 6:
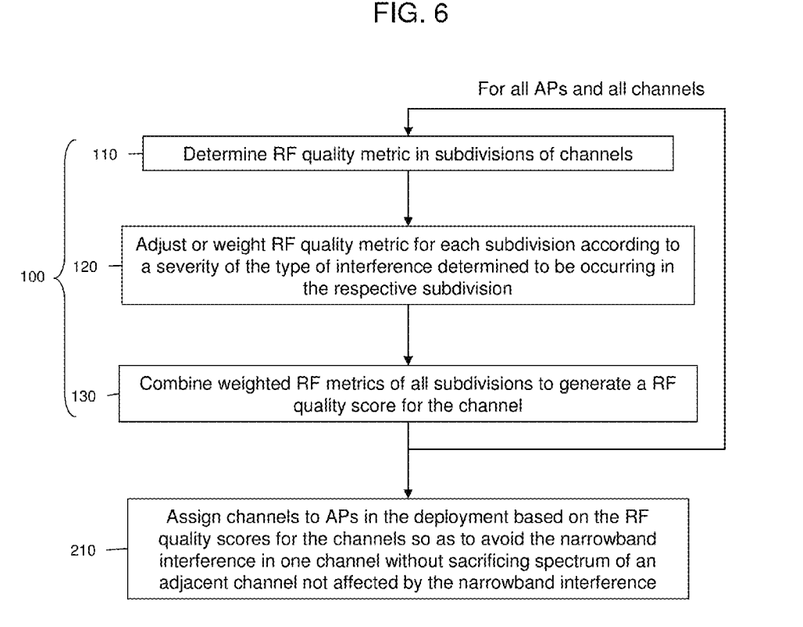
FIG. 6 is a flow chart depicting an example of the operations for channel quality determination and channel assignments made based on the channel quality information.

Reference is now made to FIGS. 5 and 6. FIG. 5 shows a channel, e.g., Channel A with a narrowband interference at 42 occurring at the lower end portion of Channel A. According to the techniques described herein, weights or penalties are imposed for channels that are determined to have the presence of narrowband interference, and the penalty can be made to be proportional to the bandwidth of the interference. As a result, channel selection and assignment can more realistically reflect the conditions of a channel and avoid undesirable channels. Moreover, channel selection is performed to exploit the overlapping nature of channels in order to avoid narrowband interferers. By intelligently combining interference information with dynamic channel assignment schemes, the available spectrum (a limited resource for some WLAN deployments) can be conserved and a significant amount of spectrum reused. The techniques are described herein with respect to 20 MHz channels in the 2.4 GHz only by way of example and because these channels are overlapping. However, these techniques are not limited to 20 MHz channels or any particular channel width or portion of a spectrum.

For the examples described herein, a channel is divided into consecutive non-overlapping regions or subdivisions 102, e.g., 5 MHz wide, for which the APs are capable of measuring and reporting on the RF interferences therein. In the example of FIG. 5, there are 4 subdivisions per channel. In general, the resolution can be (much) finer than 5 MHz, such as 156 kHz, and these are only examples. An RF quality metric is computed for each subdivision in the frequency band based on the RF energy received and analyzed in that subdivision. This RF quality metric for each subdivision is used to compute an overall RF quality score for each channel.

FIG. 6 illustrates a flow chart depicting operations of the channel quality process logic 100 and operations of the channel selection process logic 200 in one example. At 110, energy is received in each of the channels for each AP and the RF quality metric is generated for each of the subdivisions in each of a plurality of subdivisions of the channels based on a type of interference determined to be occurring in the respective subdivisions. Thus, inherent in the operation at 110 is that the received energy is analyzed for occurrence and type of interference in each channel. The RF quality metric is a measure of RF quality in terms of how well transmissions are expected to be received given what other types of energy are determined to be occurring in a channel. The lesser (or no) RF interference present in a channel, the higher the network throughput is expected for that channel. The RF quality metric is computed at the subdivision level across the frequency band and overlapping channels. For example, RF energy excluding energy when that AP (or any of its associated STAs are transmitting), is measured in each subdivision of a channel and the interference energy is analyzed to characterize/classify the interference by type based on strength, duty cycle, bandwidth, etc. This includes energy associated with a transmission from another AP in the subdivisions of that channel, e.g., from a transmission by an AP in an overlapping channel.

At 120, the RF metric for each subdivision is adjusted or weighted based on a variety of factors including Receive Signal Strength Information (RSSI) of other APs transmitting in that subdivision, ambient noise floor, unidentified interference, duty cycle, bandwidth, level (strength), etc. When energy in a subdivision has the characteristics of a narrowband interference (based on strength, duty cycle and/or bandwidth), then a more severe weight or bias is applied to the RF metric for that subdivision as compared to the weight or bias applied to ambient noise. For example, the bias or weight for the severity of narrowband interference may be set to a factor of "3" whereas the weight or bias for ambient noise is set to a factor of "1" meaning that narrowband interference is weighted three times as "bad" as ambient noise. In general, stronger interference in a subdivision may be given a higher weight than weaker interference in a subdivision. Interference energy detected in a subdivision with a higher duty cycle may be given a higher weight than energy with a lower duty cycle. RF energy in adjacent subdivisions is factored into the RF quality metrics and may be weighted proportionally based on how far away they are from the frequency being considered. Thus, at 120, a weight (based on one or more of: ambient noise floor, duty cycle, bandwidth and level) is applied to each quality metric for each subdivision according to a severity of the type of interference determined to be occurring in the respective subdivision. Said another way, the weights are applied to the quality metrics for each subdivision so as to disfavor assignment of a channel with narrowband interference to one or more APs.

At 130, the weighted RF metrics for the subdivisions of a channel are combined to produce an overall RF quality score for the channel for a given AP. The operations 110-130 are performed for each overlapping channel for all the APs in the deployment.

The following is an example of the operations 110-130 for the example of a four subdivision channel shown in FIG. 5. For a given AP, in Channel A, an RF quality metric of −60 dBm is determined for the first subdivision of Channel A (where the narrowband interference 42 is occurring) and an RF metric of −100 dBm is determined for each of the other subdivisions of Channel A. Using a bias or weight of "3" dB for a narrowband interference in a subdivision, the overall RF quality score for Channel A would be computed as LOG

[LINEAR(−60+3)+LINEAR (−100)+LINEAR(−100)+LINEAR(−100)]=−57, where the operations LOG(x)=10*log (1000*x) and LINEAR(x)=(10^(x/10))/1000. That is, the operation LOG converts a value from the linear scale to a logarithmic scale relative to 1 mW and LINEAR does the inverse, where the LOG operation is base 10. For brevity, the overall RF quality score is shown, which is a logarithmic unit, to be rounded up or down to the nearest integer. In general, the computation made at operations 120 and 130 to produce the RF quality score of a given AP for a channel (RFQC) is $$RFQC = LOG\left[\sum_{j=1}^{J} LINEAR(RFQ_j + W_j)\right],$$

where $RFQ_j$ is the RF quality metric for subdivision j, $W_j$ is the weight or bias for subdivision j that is based on the type of interference in subdivision j and any other factors as described herein, and J is the number of subdivisions in a given channel.

In another example, if the RF metric for each subdivision of a channel is determined to be −100 dBm associated with ambient noise, then a weight or bias of "0" would be applied to those RF metrics, and the overall RF quality score for the channel would be computed as LOG [LINEAR(−100+0)+LINEAR(−100+0)+LINEAR(−100+0)+LINEAR(−100+0)] =−94.

At 210, a channel selection procedure is executed to select and assign the best channels to each AP in a deployment based on the AP's RF quality scores for the channels so as to avoid the narrowband interference in one channel without sacrificing spectrum of an adjacent channel not affected by the narrowband interference. The resulting channel plan would involve channels that affect each other in the least interfering manner. The channel selection procedure at 210 may be performed by the WLAN controller 70 or by an AP equipped with that capability. Thereafter, each AP transmits wireless signals in its assigned channel(s) to the wireless client devices it serves and receives wireless signals in its assigned channel from the wireless client devices it serves. As an example, a first AP may be assigned a channel with the least RFQC value. Then, the RFQC values of channels for the remaining APs are updated to reflect that the first AP is now occupying that channel. Assignment of channels for the remaining APs continue in a similar manner.

The techniques described herein are applicable to channels of any given bandwidth, such as 40 MHz channels, and can be used to locate "cleaner" 40 MHz channels in a given frequency band, e.g., the 5 GHz frequency band. Moreover, these techniques are applicable to channels that are not overlapping. For example, the operations depicted by the flow chart of FIG. 6 may be used for non-overlapping channels, such as in the 5 GHz frequency band. When applied to a frequency band of non-overlapping channels, the flow of operations in FIG. 6 would be as follows: receiving energy in each of a plurality of channels in a frequency band in which wireless access point devices are configured to serve wireless client devices; for each AP, generating a quality metric in each of a plurality of subdivisions of the channels based on a type of interference determined to be occurring in the respective subdivisions; applying a weight to each quality metric for each subdivision according to a severity of the type of interference determined to be occurring in the respective subdivision; combining the weighted quality metrics for the plurality of subdivisions for each of the channels to generate a quality score for each channel; and assigning channels to the wireless access point devices based on the quality scores for the channels. The details for the weights described above in connection with overlapping channels are applicable to non-overlapping channels.

Furthermore, when a system configuration is employed such as that shown in FIG. 4, each AP may be configured to generate a quality metric in each of the plurality of subdivisions of the overlapping channels based on the type of interference determined to be occurring in the respective subdivisions, weight the quality metrics for each subdivision according to a severity of the type of interference determined to be occurring in the respective subdivisions to generate a quality score for each overlapping channel, and supply the quality score for each overlapping channel to a controller apparatus (e.g., WLAN controller 70), wherein the controller apparatus is configured to assign channels to APs based on the quality scores for the channels.

Figure 7:
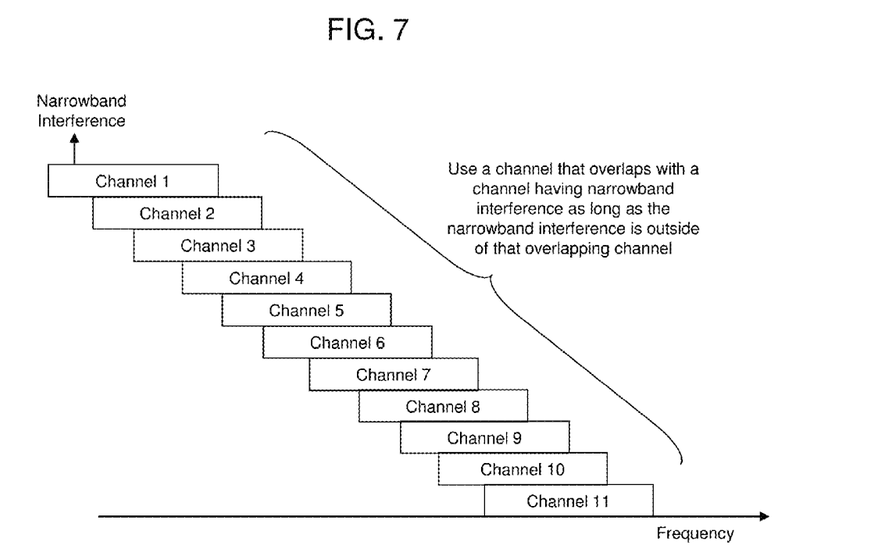
FIG. 7 is a diagram illustrating a plurality of channels in a frequency band including overlapping channels that are assigned in the presence of narrowband interference.

Reference is now made to FIG. 7 for a description of another example of channel assignment techniques. FIG. 7 shows the overlapping nature of channels in the 2.4 GHz that are used by WLANs (in the United States). The amount of overlap between channels is greater for channels closer to each other. For example, Channels 1 and 2 have more overlap than Channels 1 and 3. Channels 1 and 4 overlap but only by 5 MHz. Channels 1 and 5 are adjacent and have no overlap and Channels 1 and 6 have no overlap and are separated by 5 MHz.

For example, a deployment may use Channels 1, 4, 8 and 11. In this example, there are two sets of non-overlapping channels, i.e., channel sets {1,4} and {8,11}. Channels 1 and 4 overlap with each other by 5 MHz and Channels 8 and 11 overlap with each other by 5 MHz, but there is no overlap across these two sets of channels.

Consider an example deployment with four APs, such as that shown in FIG. 1, where the four APs 20(1)-20(4) are relatively equidistant from each other and, for example, each AP detects the same RSSI from any other AP at an amount of −20 dBm per 5 MHz. When there is no other interference in the vicinity, an optimal channel plan is to assign each of the four APs 20(1)-20(4) to channels 1, 4, 8 and 11, respectively. The RF quality score for each AP is −77 (this is because the 5 MHz where the channels overlap will have RSSI of −17 dBm when two APs are transmitting in that spectrum).

Consider now that an AP reports a narrowband interference is present within the lowest 5 MHz of Channel 1, and that it has a magnitude of −60 dBm. The RF quality scores for the four APs 20(1)-20(4) are now, respectively: −55, −77, −77 and −77 (where the weighted sum is taken in this example as the RF quality score for the channel and the narrowband interference is given a bias of "5" dB); and an arithmetic mean of −71.5. At this stage, a reasonable channel selection algorithm will attempt to search for a better channel for AP 20(1). Regardless of the particular channel selection algorithm, the best choice for this scenario is to move AP 20(1) to Channel 4, which is already occupied by AP 20(2). The RF quality scores for the four APs 20(1)-20(4) after moving AP 20(1) to Channel 4 are, respectively: −68, −68, −77 and −77, with a mean RF quality score of −72.5.

If the APs were not configured to distinguish narrowband interference from other types of interference, then they would have reported an unidentified interference of −60 dBm in the entirety of Channel 1 and the RF quality score for the four APs 20(1)-20(4), respectively, would be: −60, −77, −77, −77, which gives a mean of −72.75. Since no other channel assignment plan would yield better RF quality scores, a channel selection algorithm would elect to stay with the same configuration. Consequently, the AP 20(1) is left to suffer bad throughput performance due to the narrowband interference in Channel 1.

Consider a four AP deployment configuration as described above except that there is no restriction on the channels in the 2.4 GHz band that can be used. That is, each AP can be assigned any channel in the 2.4 GHz band, from Channels 1 to 11 (in the United States) as shown in FIG. 7. The techniques described herein can be used to even more effectively utilize the available spectrum. A channel can still be used even when it overlaps with another channel that has a narrowband interference as long as the overlapping portion does not include the narrowband interference.

In such a non-confined system deployment, when the narrowband interference is detected in Channel 1, a channel selection algorithm can move AP 20(1) to Channel 2 since narrowband interference in the lower portion of Channel 1 is not within Channel 2 and thus does not impact Channel 2. Moreover, if AP 20(2) were moved from Channel 4 to Channel 5, then AP20(1) and AP20(2) will still be overlapped by 5 MHz. AP 20(3), which is on Channel 8, will now also overlap with AP 20(2) by 5 MHz. However, the RF quality metrics for the four APs 20(1)-20(4), respectively, then become: −77, −74, −74 and −77, yielding a mean of −75.5. This is an improvement of 3 dB over the scenario where the channel sets were limited to Channels 1, 4, 8 and 11.

Figure 8:
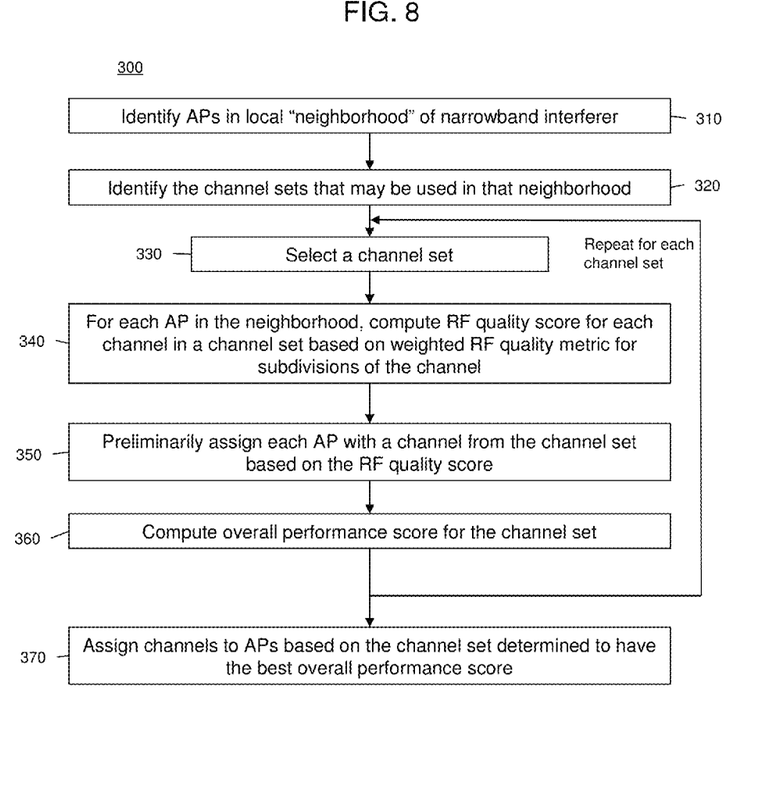
FIG. 8 is a flow chart depicting an example of operations performed to assign channels to wireless access point devices that are in the proximity of narrowband interference.

Reference is now made to FIG. 8 for a description of a flow chart that depicts a process 300 for making channel assignments using the aforementioned RF quality metrics for subdivisions of channels. This process 300 may be controlled and initiated at one of the APs or at a WLAN controller, e.g., WLAN controller 70 described above in connection with FIG. 4. To this end, that AP or the WLAN controller would store in memory instructions that are configured to cause the processor in that device to perform operations shown in FIG. 8. Operation 340 involves invoking the channel quality process logic 100, described above in connection with FIGS. 5 and 6, for each AP in the deployment.

When a narrowband interferer is detected by any of the APs, the APs in RF proximity ("neighborhood") of the narrowband interferer are identified at 310. For example, the neighborhood may be defined as all the neighboring APs that are within one-hop (one AP) from the AP(s) that detected the narrowband interference(s). At 320, the channel sets used in this neighborhood are identified. For example, in the 2.4 GHz band in the U.S., a collection of non-overlapping channel sets can be: {1,5,9}, {2,6,10}, {3,7,11}, {1,6,11}. The channels in the first three of these sets are "back-to-back", while the last channel set has a 5 MHz separation between the channels.

At 330, one of the channel sets is selected. Operations 340, 350 and 360 are then performed for each of the channel sets. At 340, for each AP in the neighborhood, the RF quality score for each channel in that channel set is computed based on weighted RF quality metrics for subdivisions of the channel, as described above of the process logic 100 in connection with FIGS. 5 and 6. At 350, for that channel set, each AP is preliminarily or provisionally assigned a channel from that channel set based on RF quality metrics determined for the channel at 340. For example, if the channel set is {1,5,9} and an AP's RF quality scores for these channels are {−80,−100,−60}, then this AP is preliminarily assigned Channel 5 since that channel has the best RF quality score. Again, the RF quality score is the one described above in which narrowband interferences are more heavily weighted against it.

At 360, an overall performance score is computed for this neighborhood for this channel set. For example, the performance score is an average quality metric for each AP, though other formulations are also possible. Operations 340-360 are repeated for all the channel sets identified at 320 to compute corresponding performance scores for all of the channel sets.

At 370, channels are assigned to APs based on the channel set determined to have the best overall performance score. For example, if the overall mean performance scores for the channel sets are:

{1,5,9}=−100
{2,6,10}=−120
{3,7,11}=−80
{1,6,11}=−100

The best channel set for this neighborhood is {3,7,11} and the APs in the vicinity of the narrowband interference are then assigned to one of Channels 3, 7 or 11, according to each AP's respective RFQC.

A criteria can be specified at 320 for identifying the channel sets to be considered. For example, if 5 MHz of overlap among channels is tolerable, then the channel sets to consider can be expanded and a collection can be: {1,4,7,10}, {2,5,8, 11} and {3,6,9}, in addition to the four listed above already. In some cases it may actually be better to accept some overlap of channels, such as when strong interferences are on either or both edges of the 2.4 GHz frequency band. The particular channel plan resulting from this scheme may be a localized decision, so the channel sets used may vary across different areas of the network. The advantage of this scheme is that APs can have choices of channels which are situated entirely away from a narrowband interferer in their environment, and at the same time one AP's channel will not cause significant adjacent channel interference to other APs. Thus, the channel sets identified at 320 may comprise, within each channel set, channels that overlap or channels that do not overlap. The techniques depicted in FIG. 8 may be extended to channel selection that switches between sets of different channel bandwidths.

Although the 5 GHz frequency band does not have any overlapping channels defined for IEEE 802.11n, the emerging IEEE 802.11ac communication standard has 80 and 160 MHz channels that may be non-contiguous. The techniques described above for non-overlapping channels are applicable to channel assignment schemes for IEEE 802.11ac for two or more channels of different bandwidths, and these two or more channels may or may not be centered at the same frequency. For example, channel selection may employ the techniques described herein to select one sub-channel of a wideband channel for use as a primary sub-channel of the wideband channel in the frequency band. Moreover, the channel quality determination techniques presented herein to handle narrowband interference are useful in connection with any channel search algorithm.

In the 5 GHz frequency band, there can be devices that operate using a frequency hopping technique. These frequency hopping devices may be treated as narrowband interferers, using the techniques described herein, in the upper portion of the 5 GHz band so as to bias against assigning channels on which frequency hopping devices are detected, and instead assign channels to APs on channels unaffected by the frequency hopping device. Thus, the operations at 320-270 in FIG. 8 are useful whether the channels in a channel sets are overlapping or non-overlapping.

The techniques described herein may be embodied in various forms, including methods, devices, systems and one or more computer readable storage media (a memory device) encoded with software comprising instructions that are operable to perform the various operations described herein. Moreover, a system is provided (also as depicted in FIG. 4) comprising a plurality of wireless devices configured to serve wireless client devices in a wireless network in a frequency band comprising a plurality of channels; and a controller apparatus configured to control the assignment of channels to the plurality of wireless devices.

The above description is intended by way of example only.

What is claimed is:

1. A method comprising:
at a wireless device that serves wireless client devices in a wireless network, receiving energy in a plurality of channels of a frequency band;
analyzing the received energy for occurrence and type of interference in each channel;
generating a quality metric for each channel based on the occurrence and type of interference detected in the channel;
assigning for each channel a bias value against selection of the channel based on whether narrowband interference is present in the channel, where assigning comprises:
determining if a channel has characteristics of narrowband interference based on one or more of strength, duty cycle, or bandwidth of energy in the channel;
when energy in a channel has the characteristics of narrowband interference, generating a bias value for that channel so as to more severely weight the corresponding quality metric of that channel as compared to a bias value applied to a different channel that comprises ambient noise;
applying the respective bias value for each channel to the quality metric for the respective channel to produce an adjusted quality metric for each channel that weights the channel against the selection of the channel for use based on the presence of narrowband interference in the channel; and
selecting a channel based on the adjusted quality metric for each of the plurality of channels.

2. The method of claim 1, wherein assigning comprises assigning the bias value to a channel to minimize impact of narrowband interference or to avoid the narrowband interference.

3. The method of claim 1, wherein assigning the bias value is based on the bandwidth of the interference in the channel relative to the bandwidth of the channel.

4. The method of claim 1, wherein selecting comprises selecting between channels that overlap such that detected narrowband interference may impact several channels.

5. The method of claim 1, wherein receiving, analyzing, generating, assigning and applying are performed with respect to a plurality of wireless devices operating in the frequency band, and wherein selecting comprises selecting channels for use by each of the plurality of wireless devices for the plurality of channels.

6. The method of claim 5, wherein selecting comprises selecting among a plurality of sets of non-overlapping channels.

7. The method of claim 5, wherein receiving, analyzing, generating, assigning, applying and selecting are performed for two or more channels of different bandwidths.

8. The method of claim 1, wherein receiving, analyzing, generating, assigning, applying and selecting are performed for two or more channels of different bandwidths.

9. The method of claim 8, wherein selecting comprises selecting one sub-channel of a wideband channel for use as a primary sub-channel of the wideband channel in the frequency band.

10. The method of claim 8, wherein selecting comprises switching between sets of different channel bandwidths.

11. The method of claim 1, and further comprising identifying a plurality of sets of channels in the frequency band that are available for use by wireless devices; for each channel set, preliminarily assigning channels for each of the wireless devices from the channels based on the bias values, and generating an overall performance score for each channel set; and wherein selecting comprises selecting channels for the wireless devices from channels in the channel set determined to have the best overall performance score.

12. The method of claim 11, wherein identifying comprises identifying channel sets that comprise, within each channel set, channels that do not overlap.

13. The method of claim 11, wherein identifying comprises identifying channel sets that comprise, within each channel set, two or more channels that overlap.

14. The method of claim 1, further comprising:
determining the strength of narrowband interference in the channels;
weighting the bias values based on the strength of the narrowband interference in the channels.

15. An apparatus comprising:
a receiver configured to receive energy in a plurality of channels of a frequency band;
a spectrum analysis unit configured to analyze energy received in the plurality of channels for occurrence and type of interference in each channel; and
a controller coupled to the spectrum analysis unit and configured to:
generate a quality metric for each channel based on the occurrence and type of interference detected in the channel;
assign for each channel a bias value against selection of the channel based on whether narrowband interference is present in the channel, wherein to assign the bias value the spectrum analysis unit is further configured to:
determine if a channel has characteristics of narrowband interference based on one or more of strength, duty cycle, or bandwidth of energy in the channel;
when energy in a channel has the characteristics of narrowband interference, generating a bias value for that channel so as to more severely weight the corresponding quality metric of that channel as compared to a bias value applied to a different channel that comprises ambient noise;
applying the respective bias value for each channel to the quality metric for the respective channel to produce an adjusted quality metric for each channel that weights the channel against the selection of the channel for use based on the presence of narrowband interference in the channel; and
select a channel based on the adjusted quality metric for each of the plurality of channels.

16. The apparatus of claim 15, wherein the controller is further configured to assign the bias value based on the bandwidth of the interference in the channel relative to the bandwidth of the channel.

17. A system comprising:
a plurality of wireless devices configured to serve wireless client devices in a wireless network in a frequency band comprising a plurality of channels, each wireless device configured to receive energy in the plurality of channels, analyze the received energy for occurrence and type of interference in each channel, and generate a quality metric for each channel based on the occurrence and type of interference detected in the channel; and a controller apparatus configured to control the assignment of channels to the plurality of wireless devices, wherein the controller apparatus is configured to:
    for each of the plurality of wireless devices, assign for each channel a bias value against selection of the channel based on whether narrowband interference is present in the channel, wherein to assign a bias value the controller is further configured to:
        determine if a channel has characteristics of narrowband interference based on one or more of strength, duty cycle, or bandwidth of energy in the channel,
        when energy in a channel has the characteristics of narrowband interference, generating a bias value for that channel so as to more severely weight the corresponding quality metric of that channel as compared to a bias value applied to a different channel that comprises ambient noise;
    applying the respective bias value for each channel to the quality metric for the respective channel to produce an adjusted quality metric for each channel that weights the channel against the selection of the channel for use based on the presence of narrowband interference in the channel; and
    select a channel based on the adjusted quality metric for each of the plurality of channels.

18. The system of claim 17, wherein the controller apparatus is configured to: identify a plurality of sets of channels in the frequency band that are available for use by the wireless devices; for each channel set, preliminarily assign channels for each of the wireless devices from the channels based on the bias values, generate an overall performance score for each channel set; and select channels for the wireless devices from channels in the channel set determined to have the best overall performance score.

19. The system of claim 18, wherein the controller apparatus is configured to identify channel sets that comprise, within each channel set, channels that do not overlap.

20. The system of claim 18, wherein the controller apparatus is configured to identify channel sets that comprise, within each channel set, two or more channels that overlap.

* * * * *